US 9,487,930 B2

(12) United States Patent
Hamasaki et al.

(10) Patent No.: US 9,487,930 B2
(45) Date of Patent: Nov. 8, 2016

(54) DRIVE DEVICE FOR CONSTRUCTION MACHINE

(71) Applicant: KOBELCO CONSTRUCTION MACHINERY CO., LTD., Hiroshima-shi (JP)

(72) Inventors: Masatsugu Hamasaki, Hiroshima (JP); Koji Yamashita, Hiroshima (JP); Shoji Yoichi, Gifu (JP); Ryo Uchiyama, Gifu (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 85 days.

(21) Appl. No.: 14/396,830

(22) PCT Filed: Apr. 11, 2013

(86) PCT No.: PCT/JP2013/002466
§ 371 (c)(1),
(2) Date: Oct. 24, 2014

(87) PCT Pub. No.: WO2013/161205
PCT Pub. Date: Oct. 31, 2013

(65) Prior Publication Data
US 2015/0099604 A1     Apr. 9, 2015

(30) Foreign Application Priority Data
Apr. 26, 2012   (JP) ................. 2012-101064

(51) Int. Cl.
*E02F 9/20*         (2006.01)
*F16H 1/46*         (2006.01)
(Continued)

(52) U.S. Cl.
CPC .............. *E02F 9/202* (2013.01); *E02F 9/123* (2013.01); *E02F 9/128* (2013.01); *F16D 55/38* (2013.01); *F16H 1/28* (2013.01)

(58) Field of Classification Search
CPC .... E02F 9/128; E02F 9/202; F16H 2057/087
USPC .................................................. 475/337, 900
See application file for complete search history.

(56) References Cited

U.S. PATENT DOCUMENTS 4,441,691 A * 4/1984 Nagahara ................ F16H 3/721
                                                        254/344
6,817,963 B1    11/2004 Solka
(Continued)

FOREIGN PATENT DOCUMENTS

CN         1705600 A      12/2005
CN       101955136 A       1/2011
(Continued)

OTHER PUBLICATIONS

Extended European Search Report issued Jul. 9, 2015 in Patent Application No. 13781771.4
(Continued)

*Primary Examiner* — Sherry Estremsky
(74) *Attorney, Agent, or Firm* — Oblon, McClelland, Maier & Neustadt, L.L.P.

(57) ABSTRACT

A drive device for a construction machine includes a speed reducer and a brake mechanism. The speed reducer includes a rotating shaft disposed in a casing, and a planetary gear type speed reducing unit disposed in the casing. The speed reducing unit includes a sun gear, a ring gear, a planetary gear which is meshed with the sun gear and the ring gear, and a spider member which supports the planetary gear so that the planetary gear is rotatable. The brake mechanism includes a rotating-shaft-side brake plate provided on an outer periphery of the spider member in a state that the rotating-shaft-side brake plate is integrally rotated with the spider member, a casing-side brake plate provided on the casing, and a brake piston which generates the braking force by bringing the rotating-shaft-side brake plate and the casing-side brake plate to press contact with each other.

5 Claims, 2 Drawing Sheets

(51) Int. Cl.
*E02F 9/12* (2006.01)
*F16D 55/38* (2006.01)
*F16H 1/28* (2006.01)

(56) References Cited

U.S. PATENT DOCUMENTS

| | | | |
|---|---|---|---|
| 7,044,883 B2* | 5/2006 | Andersson | B60K 17/046 |
| | | | 180/344 |
| 9,279,233 B2* | 3/2016 | Okada | F16H 57/0454 |
| 2004/0074707 A1 | 4/2004 | Jessen et al. | |
| 2005/0288145 A1 | 12/2005 | Andersson et al. | |
| 2007/0105686 A1* | 5/2007 | Andersson | B60K 17/046 |
| | | | 475/323 |
| 2014/0296016 A1* | 10/2014 | Okada | F16H 57/0454 |
| | | | 475/159 |
| 2015/0226288 A1* | 8/2015 | Shizu | F16H 1/28 |
| | | | 475/149 |

FOREIGN PATENT DOCUMENTS

| | | |
|---|---|---|
| CN | 201916441 U | 8/2011 |
| DE | 197 18 744 C1 | 11/1998 |
| EP | 1 234 993 A1 | 8/2002 |
| JP | 2007-39990 | 2/2007 |
| JP | 2007-039990 * | 2/2007 |
| JP | 2011-21405 | 2/2011 |
| JP | 2012-77862 | 4/2012 |

OTHER PUBLICATIONS

International Search Report issued Jun. 18, 2013, in PCT/JP2013/002466, filed Apr. 11, 2013.

* cited by examiner

DRIVE DEVICE FOR CONSTRUCTION MACHINE

TECHNICAL FIELD

The present invention relates to a drive device for driving a driven unit such as an upper slewing body in a construction machine such as a hydraulic excavator or a hybrid excavator.

BACKGROUND ART

The background art is described by an example of a slewing drive device for an excavator.

The excavator is provided with a crawler-type lower traveling body, an upper stewing body loaded on the lower traveling body to be slewable around an axis perpendicular to the ground, and a working attachment attached to the upper slewing body.

The slewing drive device for the excavator is configured to slew the upper slewing body. The stewing drive device is provided with a hydraulic motor or an electric motor as a drive source, and a speed reducer including a gear reduction mechanism for reducing a speed of a rotation of the motor to transmit the rotation whose speed is reduced by the gear reduction mechanism to the upper slewing body as a driven unit.

The motor and the speed reducer are arranged side by side along the axis direction of the slewing drive device in a state that the rotating axes thereof are aligned with each other. The motor and the speed reducer are mounted on an upper frame in a vertical posture such that the motor is disposed above the speed reducer.

The speed reducer is a planetary gear speed reducer including a sun gear, a plurality of planetary gears, and a ring gear disposed around the rotating axis of the speed reducer. The output of the speed reducer is transmitted to the upper slewing body, whereby the upper slewing body is slewed.

A general stewing drive device is configured as described above. Patent literature 1 discloses a slewing drive device provided with a brake mechanism in a speed reducer.

The speed reducer of the stewing drive device disclosed in patent literature 1 is provided with a plurality of speed reducing units arranged side by side along the axis direction of the rotating shaft of the speed reducer. The brake mechanism provided in the speed reducer includes a rotating-shaft-side brake plate mounted on the rotating shaft at a position between the speed reducing units adjacent to each other, a casing-side brake plate provided on the inner periphery of a casing, and a brake piston. The rotating-shaft-side brake plate and the casing-side brake plate are brought into press contact with each other by a pressing force of the brake piston, whereby a braking force is exerted on the rotating shaft of the speed reducer.

In the slewing drive device disclosed in patent literature 1, a brake mechanism is interposed between the speed reducing units adjacent to each other. This may increase the size of the speed reducer in the axis direction of the rotating shaft. As a result, the overall size of the slewing drive device in the axis direction may increase. In a construction machine such as an excavator, the entire length of the slewing drive device is restricted for a reason such that a hydraulic pipe is disposed above the slewing drive device. Therefore, an increase in the axial size of the slewing drive device as described above makes it difficult to mount the slewing drive device in the construction machine.

Further, in a disc brake mechanism for braking a rotating shaft by a frictional force between brake plates, there is a demand for increasing the distance (hereinafter, called as a brake effective radius) from the center of the rotating shaft to the point of friction between the brake plates as much as possible in order to enhance the braking performance. In order to satisfy the above demand, in patent literature 1, a disc-shaped brake connecting member is mounted on the outer periphery of the rotating shaft, and a rotating-shaft-side brake plate is mounted on the outer periphery of the brake connecting member, whereby the brake effective radius is increased.

In the above configuration, however, the number of components may be increased, the cost necessary for the brake mechanism may be increased, and the assembling performance of the brake mechanism may be deteriorated. There is an idea of increasing the brake effective radius in a state that the rotating-shaft-side brake plate is directly mounted on the rotating shaft by increasing the outer diameter of the rotating-shaft-side brake plate. Even in this configuration, however, the problems relating to the cost necessary for the brake mechanism, and the assembling performance of the brake mechanism are not solved.

CITATION LIST

Patent Literature

Patent literature 1: Japanese Unexamined Patent Publication No. 2007-39990

SUMMARY OF INVENTION

An object of the invention is to provide a drive device for a construction machine which enables to enhance the braking performance of a brake mechanism, while reducing the axial size of the drive device, and which enables to suppress the cost necessary for the brake mechanism, and to enhance the assembling performance of the brake mechanism.

A drive device for a construction machine according to an aspect of the invention is provided with a motor as a drive source; a speed reducer which transmits a rotation of the motor to a driven unit at a reduced speed; and a brake mechanism which generates a braking force against the rotation to be transmitted from the speed reducer to the driven unit. The speed reducer includes a casing, a rotating shaft disposed in the casing, and a planetary gear type speed reducing unit disposed in the casing. The speed reducing unit includes a sun gear, a ring gear disposed to surround the outer side of the sun gear, a planetary gear which is meshed with the sun gear and the ring gear and is rotated as the sun gear is rotated, and a spider member which supports the planetary gear so that the planetary gear is rotatable. The brake mechanism includes a rotating-shaft-side brake plate provided on the outer periphery of the spider member in a state that the rotating-shaft-side brake plate is integrally rotated with the spider member, a casing-side brake plate provided on the casing, and a brake piston which generates the braking force by bringing the rotating-shaft-side brake plate and the casing-side brake plate to press contact with each other.

DESCRIPTION OF EMBODIMENTS

An embodiment of the invention is an example, in which the configuration of the invention is applied to a slewing drive device for an excavator. As well as the slewing drive device, the invention is applicable to another drive device configured such that a motor and a speed reducer are arranged side by side along the axis direction of the drive device in a state that the centers of rotating shafts of the motor and of the speed reducer are aligned with each other, and a brake mechanism is provided in the speed reducer. The invention is also applicable to a drive device for a construction machine other than an excavator.

Figure 1:
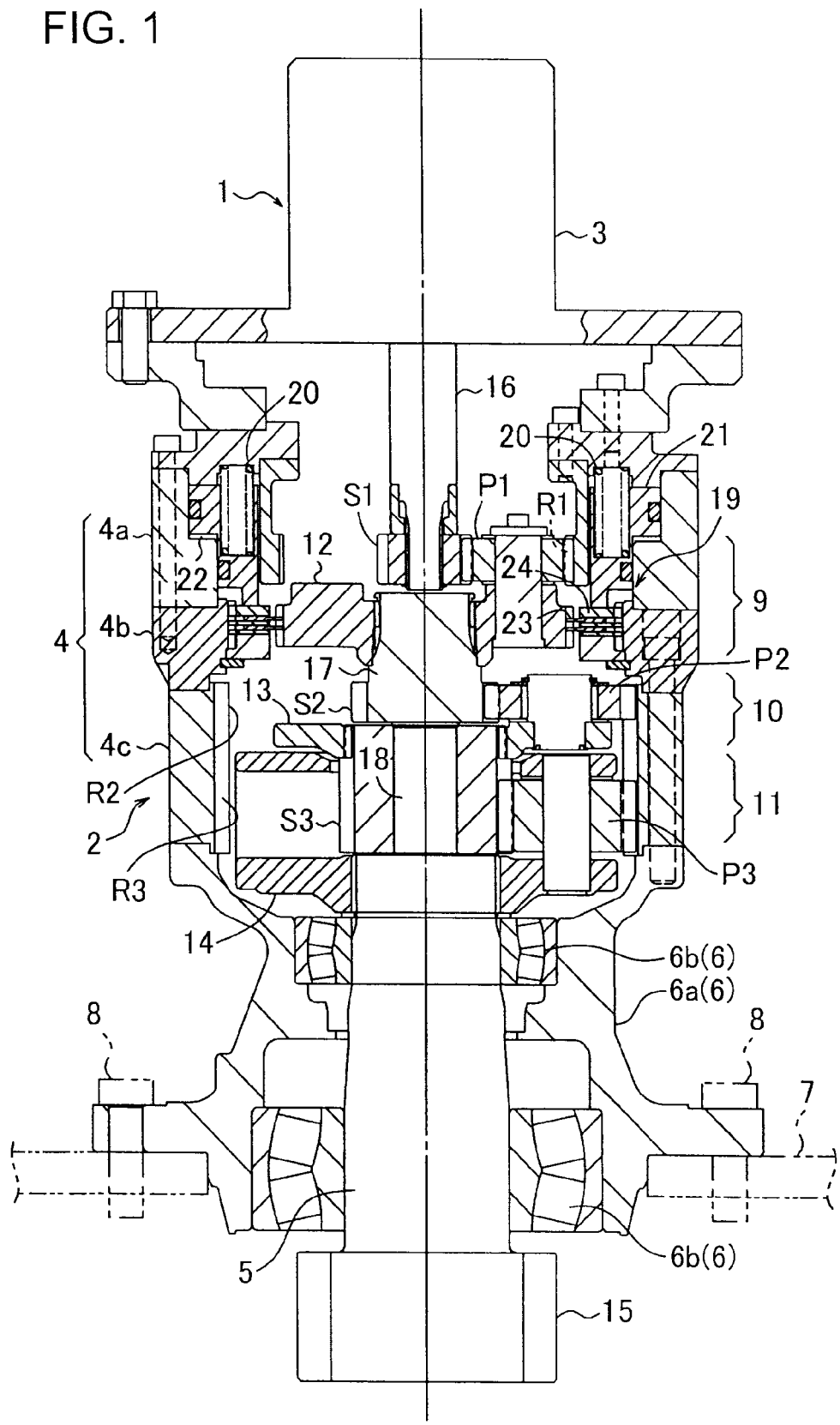
FIG. 1 is a partially sectional side view of a slewing drive device according to an embodiment of the invention.

As illustrated in FIG. 1, a slewing drive device according to an embodiment of the invention is provided with a motor 1 as a drive source, and a speed reducer 2 adapted to transmit the rotation of the motor 1 to an upper slewing body as a driven unit at a reduced speed.

The motor 1 is a hydraulic motor or an electric motor. The motor 1 includes a motor housing 3. The speed reducer 2 includes a tubular speed reducer casing 4. Hereinafter, the speed reducer casing 4 is simply called as the casing 4. The motor 1 and the speed reducer 2 are interconnected to each other by fastening the motor housing 3 and the casing 4 to each other by bolts in a vertical posture such that the motor 1 is disposed above the speed reducer 2, and the center of the rotating shaft of the motor 1 is aligned with the center of the rotating shaft of the speed reducer 2.

The speed reducer 2 includes a reducer output shaft 5 adapted to output a rotation whose speed is reduced by the speed reducer 2, and a shaft support unit 6 adapted to support the reducer output shaft 5. The shaft support unit 6 is mounted on the lower end of the casing 4. The shaft support unit 6 supports the reducer output shaft 5 so that the reducer output shaft 5 is rotatable. The shaft support unit 6 has a hollow support unit housing body 6a mounted on the lower end of the casing 4, and two bearings 6b disposed in the support unit housing body 6a and configured to support the reducer output shaft 5 so that the reducer output shaft 5 is rotatable. The support unit housing body 6a is fastened to an upper frame 7 of the upper slewing body by a plurality of attaching bolts 8.

Further, the speed reducer 2 includes a first rotating shaft 17 and a second rotating shaft 18 disposed in the casing 4, and three-stage planetary gear type speed reducing units disposed in the casing 4.

The first rotating shaft 17 is disposed below a motor shaft 16 to be disposed coaxially with the motor shaft 16, which is the rotating shaft of the motor 1. The second rotating shaft 18 is disposed below the first rotating shaft 17 to be disposed coaxially with the first rotating shaft 17. Further, the reducer output shaft 5 is disposed below the second rotating shaft 18 to be disposed coaxially with the second rotating shaft 18.

The three-stage speed reducing units provided in the speed reducer 2 are constituted of a first speed reducing unit 9, a second speed reducing unit 10, and a third speed reducing unit 11 arranged side by side along the axis direction of the rotating shafts 17 and 18 of the speed reducer 2. Among the speed reducing units 9, 10, and 11, the first speed reducing unit 9 is a highest speed reducing unit which reduces the speed of the highest speed rotation (the rotation of the motor 1). The second speed reducing unit 10 is configured to reduce further the speed of the rotation whose speed is reduced by the first speed reducing unit 9, and the third speed reducing unit 11 is configured to reduce further the speed of the rotation whose speed is reduced by the second speed reducing unit 10.

The first speed reducing unit 9 includes a first sun gear S1, a first planetary gear P1, a first ring gear R1, and a first spider member 12. The second speed reducing unit 10 includes a second sun gear S2, a second planetary gear P2, a second ring gear R2, and a second spider member 13. The third speed reducing unit 11 includes a third sun gear S3, a third planetary gear P3, a third ring gear R3, and a third spider member 14.

The first sun gear S1 is mounted on the motor shaft 16 to be disposed coaxially with the motor shaft 16. The first ring gear R1 is disposed so as to radially surround the outer side of the first sun gear S1, and is indirectly fixed to the casing 4. The first planetary gear P1 is disposed on the radially outer side of the first sun gear S1 and is disposed on the radially inner side of the first ring gear R1 in mesh with the first sun gear S1 and with the first ring gear R1. The first spider member 12 supports the first planetary gear P1 so that the first planetary gear P1 is rotatable, and is spline-connected to the outer periphery of the first rotating shaft 17. According to this configuration, the first spider member 12 is mounted on the first rotating shaft 17 in a state that the first spider member 12 is integrally rotatable with the first rotating shaft 17. The first planetary gear P1 is revolved, while rotating on its own axis, as the first sun gear S1 is rotated. According to this configuration, the first speed reducing unit 9 reduces the speed of the rotation from the motor shaft 16 of the motor 1, and the rotation whose speed is reduced is transmitted from the first spider member 12 to the first rotating shaft 17.

The second sun gear S2 is mounted on the outer periphery of the first rotating shaft 17 to be disposed coaxially with the first rotating shaft 17. The second ring gear R2 is disposed so as to radially surround the outer side of the second sun gear S2. The second ring gear R2 is provided on the inner periphery of the casing 4, specifically, on the inner periphery of a third casing segment 4c to be described later. The second planetary gear P2 is disposed on the radially outer side of the second sun gear S2 and is disposed on the radially inner side of the second ring gear R2 in mesh with the second sun gear S2 and with the second ring gear R2. The second spider member 13 supports the second planetary gear P2 so that the second planetary gear P2 is rotatable, and is spline-connected to the outer periphery of the second rotating shaft 18. According to this configuration, the second spider member 13 is mounted on the second rotating shaft 18 in a state that the second spider member 13 is integrally rotatable with the second rotating shaft 18. The second planetary gear P2 is revolved, while rotating on its own axis, as the second sun gear S2 is rotated. According to this configuration, the second speed reducing unit 10 reduces the speed of the rotation from the first rotating shaft 17, and the rotation whose speed is reduced is transmitted from the second spider member 13 to the second rotating shaft 18.

The third sun gear S3 is mounted on the outer periphery of the second rotating shaft 18 to be disposed coaxially with the second rotating shaft 18. The third ring gear R3 is disposed so as to radially surround the outer side of the second sun gear S2, and is mounted on the inner periphery of the casing 4, specifically, mounted on the inner periphery of the third casing segment 4c to be described later. The third planetary gear P3 is disposed on the radially outer side of the third sun gear S3 and is disposed on the radially inner side of the third ring gear R3 in mesh with the third sun gear S3 and with the third ring gear R3. The third spider member 14 supports the third planetary gear P3 so that the third planetary gear P3 is rotatable, and is spline-connected to the outer periphery of the upper end of the reducer output shaft 5. According to this configuration, the third spider member 14 is mounted on the reducer output shaft 5 in a state that the third spider member 14 is integrally rotatable with the reducer output shaft 5. The third planetary gear P3 is revolved, while rotating on its own axis, as the third sun gear S3 is rotated. According to this configuration, the third speed reducing unit 11 reduces the speed of the rotation from the second rotating shaft 18, and the rotation whose speed is reduced is transmitted from the third spider member 14 to the reducer output shaft 5 so as to rotate the reducer output shaft 5. When the reducer output shaft 5 is rotated, a pinion gear 15 mounted on the lower end of the reducer output shaft 5 is rotated in mesh with an unillustrated slewing gear (ring gear). Thus, the overall slewing drive device is slewed, and the upper frame 7 of the upper slewing body as a driven unit, which is connected to the support unit housing body 6a of the slewing drive device, is slewed.

Further, the casing 4 includes a first casing segment 4a, a second casing segment 4b, and the third casing segment 4c. These casing segments 4a, 4b, and 4c are arranged side by side in this order along the axis direction (the axis direction of the rotating shafts 17 and 18) of the speed reducer 2. The casing 4 is formed by bolt-connecting the adjacent casing segments among the casing segments 4a, 4b, and 4c. The first speed reducing unit 9 and a brake mechanism 19 are disposed in the first casing segment 4a and in the second casing segment 4b as shared casing segments. The second speed reducing unit 10 and the third speed reducing unit 11 are disposed in the third casing segment 4c.

Figure 2:
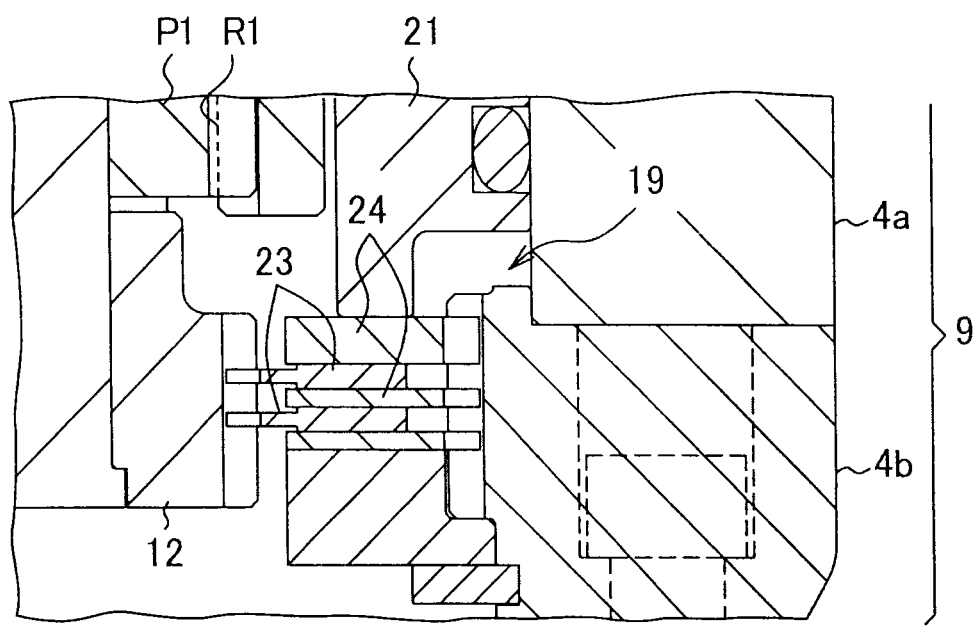
FIG. 2 is a partially enlarged view of FIG. 1.

The slewing drive device in the embodiment includes the disc-type and negative brake mechanism 19 adapted to generates a braking force against a rotation to be transmitted from the speed reducer 2 to the upper slewing body as a driven unit. The brake mechanism 19 is disposed in the speed reducer 2. The configuration of the brake mechanism 19 is described in details referring to FIG. 1, and FIG. 2, which is a partially enlarged view of FIG. 1.

The brake mechanism 19 includes a ring-shaped brake piston 21 which is pressed (urged) downward by a spring 20, a pressure chamber 22 to which hydraulic oil is introduced at the time of rotating the motor 1, a plurality of rotating-shaft-side brake plates 23 and a plurality of casing-side brake plates 24, the rotating-shaft-side brake plates 23 and the casing-side brake plates 24 being disposed below the brake piston 21.

The rotating-shaft-side brake plates 23 and the casing-side brake plates 24 are disposed to alternately place one over the other in up and down directions. The rotating-shaft-side brake plate 23 is formed into a ring shape. The rotating-shaft-side brake plate 23 is a member independent of the first spider member 12 of the first speed reducing unit 9, and is spline-connected to the outer periphery of the first spider member 12. According to this configuration, the rotating-shaft-side brake plate 23 is integrally rotatable with the first spider member 12 and is movable up and down relative to the first spider member 12.

On the other hand, the casing-side brake plate 24 is spline-connected to the inner periphery of the second casing segment 4b. According to this configuration, the casing-side brake plate 24 is mounted on the second casing segment 4b in a state that the casing-side brake plate 24 is unrotatable relative to the second casing segment 4b and is movable up and down relative to the second casing segment 4b.

The brake piston 21 is configured to generate a braking force by bringing the rotating-shaft-side brake plate 23 and the casing-side brake plate 24 to press contact with each other. Specifically, at the time of stopping rotating the motor 1, a braking force is generated by pressing contact between the rotating-shaft-side brake plate 23 and the casing-side brake plate 24 adjacent to each other, as illustrated in the drawings, due to the pressing force of the brake piston 21.

The rotation of the first rotating shaft 17, and resultantly, of the second rotating shaft 18 and of the reducer output shaft 5 is restrained by the generated braking force, whereby the first rotating shaft 17, the second rotating shaft 18, and the reducer output shaft 5 are made unrotatable. On the other hand, at the time of rotating the motor 1, the brake piston 21 is raised by introduction of hydraulic oil to the pressure chamber 22. As a result, the pressing contact between the rotating-shaft-side brake plate 23 and the casing-side brake plate 24 adjacent to each other is released, whereby a braking force is not generated. Thus, the braking of the first rotating shaft 17, the second rotating shaft 18, and the reducer output shaft 5 is released.

According to the slewing drive device in the embodiment, the following advantageous effects are obtained.

(I) In the slewing drive device in the embodiment, the rotating-shaft-side brake plate 23 is mounted on the outer periphery of the first spider member 12 in a state that the rotating-shaft-side brake plate 23 is integrally rotatable with the first spider member 12, the first spider member 12 being adapted to support the planetary gear P of the first speed reducing unit 9 so that the planetary gear P is rotatable. In other words, the first spider member 12 is used as a base member for the rotating-shaft-side brake plate 23 in the brake mechanism 19. According to this configuration, it is possible to reduce the axial space necessary only for the brake mechanism 19. This makes it possible to reduce the entire length of the slewing drive device in the axis direction thereof.

(II) Basically, a braking torque generated by friction between the rotating-shaft-side brake plate 23 and the casing-side brake plate 24 is expressed by a product of the brake effective radius, the friction coefficient, and the pressing force of the casing-side brake plate 24 against the rotating-shaft-side brake plate 23. Specifically, as the brake effective radius is increased, the braking torque is increased. In the slewing drive device in the embodiment, the rotating-shaft-side brake plate 23 is disposed on the outer periphery of the first spider member 12 which is a ring-shaped member having a certain radius. According to the above configuration, it is possible to secure a large brake effective radius for the brake plate 23. Thus, it is possible to secure high braking performance of the brake mechanism 19. Further, unlike a conventional slewing drive device, it is not necessary to provide an additional component such as a brake connecting member and to increase the diameter of the brake plate. Thus, it is possible to suppress the cost necessary for the brake mechanism 19, and to enhance the assembling performance of the brake mechanism 19.

(III) The rotating-shaft-side brake plate 23 is formed into a ring-shaped member independent of the first spider member 12, and is spline-connected to the outer periphery of the first spider member 12. Accordingly, as compared with a configuration, in which the rotating-shaft-side brake plate is integrally formed with a spider member to constitute a part of the spider member, the above configuration makes it possible to enhance the assembling performance of the brake mechanism 19, and makes it easy to replace the rotating-shaft-side brake plate 23 resulting from wear of the rotating-shaft-side brake plate 23 and to perform adjustment which involves an increase or a decrease in the number of rotating-shaft-side brake plates 23.

(IV) The distance from the center of the first rotating shaft 17 to the spline connecting portion between the rotating-shaft-side brake plate 23 and the first spider member 12 is sufficiently large. This reduces the load exerted on the spline connecting portion in a tangential direction. Accordingly, it is possible to reduce the strength necessary for the connecting portion between the rotating-shaft-side brake plate 23 and the first spider member 12.

(V) The rotating-shaft-side brake plate 23 is provided on the outer periphery of the first spider member 12 of the first speed reducing unit 9, the first speed reducing unit 9 being configured to reduce the speed of the highest speed rotation, among the first speed reducing unit 9, the second speed reducing unit 10, and the third speed reducing unit 11. According to the above configuration, it is possible to generate a braking action at a portion where the rotational torque is smallest. This makes it possible to obtain a large braking effect with a small braking torque.

(VI) The casing 4 of the speed reducer 2 is divided into the three casing segments 4a, 4b, and 4c in the axis direction, and the first speed reducing unit 9 and the brake mechanism 19 are commonly disposed in the first casing segment 4a and in the second casing segment 4b. This makes it easy to assemble the speed reducer 2 including incorporation of the brake mechanism 19. Further, in some of the drive devices, while there may be provided only two speed reducing units, a brake mechanism may not be provided or a brake mechanism may be provided around a motor shaft. In the slewing drive device in the embodiment, it is possible to mount and dismount a set of the first speed reducing unit 9 and the brake mechanism 19 with the casing segments 4a and 4b. This makes it easy to cope with a change in the specifications as described above.

Other Embodiments (1) In the embodiment, the drive device is of a vertical type such that the motor 1 and the speed reducer 2 are arranged side by side vertically. The invention is also applicable to a drive device of a horizontal type such that a motor and a speed reducer are arranged side by side horizontally.

(2) In the embodiment, the rotating-shaft-side brake plate 23 is spline-connected to the outer periphery of the first spider member 12 of the first speed reducing unit 9. Alternatively, the rotating-shaft-side brake plate may be bolt-connected to the outer periphery of the first spider member 12. Further alternatively, the rotating-shaft-side brake plate may be integrally formed with the first spider member 12 to constitute a part of the first spider member 12. In the above modification, the rotating-shaft-side brake plate is a fixed brake plate incapable of moving in up and down directions. Accordingly, in the above modification, braking and releasing the braking may be switched over by causing the casing-side brake plate 24 as a movable brake plate to come into pressing contact with one side surface of the rotating-shaft-side brake plate and to move away from the one side surface.

(3) In the aspect of securing a braking performance, it is advantageous that the rotating-shaft-side brake plate 23 is mounted on the outer periphery of the first spider member 12 of the first speed reducing unit 9 as the highest speed reducing unit, like the above embodiment. Alternatively, however, the rotating-shaft-side brake plate may be disposed on the outer periphery of the second spider member 13 of the second speed reducing unit 10, or on the outer periphery of the third spider member 14 of the third speed reducing unit 11.

(4) The speed reducing units to be disposed in the casing of the speed reducer are not necessarily three-stage speed reducing units. For instance, there may be provided only one-stage speed reducing unit in the casing. Further alternatively, two-stage or more than four-stage speed reducing units may be provided in the casing.

Summary of Embodiment

The following is a summary of the embodiment.

The drive device for the construction machine in the embodiment includes a motor as a drive source; a speed reducer which transmits a rotation of the motor to a driven unit at a reduced speed; and a brake mechanism which generates a braking force against the rotation to be transmitted from the speed reducer to the driven unit. The speed reducer includes a casing, a rotating shaft disposed in the casing, and a planetary gear type speed reducing unit disposed in the casing. The speed reducing unit includes a sun gear, a ring gear disposed to surround an outer side of the sun gear, a planetary gear which is meshed with the sun gear and the ring gear and is rotated as the sun gear is rotated, and a spider member which supports the planetary gear so that the planetary gear is rotatable. The brake mechanism includes a rotating-shaft-side brake plate provided on an outer periphery of the spider member in a state that the rotating-shaft-side brake plate is integrally rotated with the spider member, a casing-side brake plate provided on the casing, and a brake piston which generates the braking force by bringing the rotating-shaft-side brake plate and the casing-side brake plate to press contact with each other.

According to the above configuration, the rotating-shaft-side brake plate is provided on the outer periphery of the spider member in a state that the rotating-shaft-side brake plate is integrally rotatable with the spider member, the spider member being adapted to support the planetary gear of the speed reducing unit so that the planetary gear is rotatable. In other words, the spider member is used as a base member for the rotating-shaft-side brake plate in the brake mechanism. According to this configuration, it is possible to reduce the space necessary only for the brake mechanism in the axis direction of the rotating shaft. This makes it possible to reduce the entire length of the drive device in the axis direction. Further, the rotating-shaft-side brake plate is provided on the outer periphery of the spider member. Accordingly, it is possible to secure a large brake effective radius for the rotating-shaft-side brake plate. This makes it possible to secure high braking performance of the brake mechanism. Further, unlike a conventional slewing drive device, it is not necessary to provide an additional component such as a brake connecting member and to increase the diameter of the brake plate. Thus, it is possible to suppress the cost necessary for the brake mechanism, and to enhance the assembling performance of the brake mechanism.

In the drive device for the construction machine, preferably, the rotating-shaft-side brake plate is a ring-shaped member independent of the spider member, and the rotating-shaft-side brake plate is spline-connected to the outer periphery of the spider member.

According to the above configuration, as compared with a configuration in which the rotating-shaft-side brake plate is integrally formed with a spider member to constitute a part of the spider member, the above configuration makes it possible to enhance the assembling performance of the brake mechanism, and makes it easy to replace the rotating-shaft-side brake plate resulting from wear of the rotating-shaft-side brake plate and to perform adjustment which involves an increase or a decrease in the number of rotating-shaft-side brake plates.

Further, in the above configuration, it is possible to secure a large distance from the center of the rotating shaft to the spline connecting portion between the rotating-shaft-side brake plate and the spider member. This reduces the load exerted on the spline connecting portion in a tangential direction. Accordingly, it is possible to reduce the strength necessary for the connecting portion between the rotating-shaft-side brake plate and the spider member.

In the drive device for the construction machine, preferably, the speed reducer includes a plurality of speed reducing units, and the rotating-shaft-side brake plate is provided on an outer periphery of the spider member of a highest speed reducing unit of the plurality of speed reducing units that reduces a speed of a highest speed rotation.

According to the above configuration, it is possible to generate a braking action at a portion where the rotational torque is smallest. This makes it possible to obtain a large braking effect with a small braking torque.

In the above configuration, preferably, the casing of the speed reducer includes a plurality of casing segments arranged in an axis direction of the rotating shaft, and the highest speed reducing unit and the brake mechanism are disposed in shared casing segment among the plurality of the casing segments.

The above configuration makes it easy to assemble the speed reducer including incorporation of the brake mechanism. Further, in some of the drive devices, while there may be provided only two speed reducing units, a brake mechanism may not be provided or a brake mechanism may be provided around a motor shaft. In the above configuration, it is possible to mount and dismount a set of the highest speed reducing unit and the brake mechanism with the shared casing segment. This makes it easy to cope with a change in the specifications as described above.

As described above, according to the embodiment, it is possible to enhance the braking performance of a brake mechanism, while reducing the axial size of the drive device for the construction machine, and to suppress the cost necessary for the brake mechanism and to enhance the assembling performance of the brake mechanism.

The invention claimed is:

1. A drive device for a construction machine, comprising:
a motor as a drive source;
a speed reducer which transmits a rotation of the motor to a driven unit at a reduced speed; and
a brake mechanism which generates a braking force against the rotation to be transmitted from the speed reducer to the driven unit, wherein
the speed reducer includes a casing, a rotating shaft disposed in the casing, and a planetary gear type speed reducing unit disposed in the casing,
the speed reducing unit includes a sun gear, a ring gear disposed to surround an outer side of the sun gear, a planetary gear which is meshed with the sun gear and the ring gear and is rotated as the sun gear is rotated, and a spider member which supports the planetary gear so that the planetary gear is rotatable, and
the brake mechanism includes a rotating-shaft-side brake plate provided on an outer periphery of the spider member in a state that the rotating-shaft-side brake plate is integrally rotated with the spider member, a casing-side brake plate provided on the casing, and a brake piston which generates the braking force by bringing the rotating-shaft-side brake plate and the casing-side brake plate to press contact with each other, wherein
the casing is divided into a plurality of casing segments in an axis direction of the rotating shaft, the plurality of casing segments being detachably combined with each other,
the plurality of casing segments include a first casing segment, a second casing segment and a third casing segment which are arranged in order from the motor side,
the brake piston is disposed in the first casing segment, and
the rotating-shaft-side brake plate and the casing-side brake plate are disposed in the second casing segment.

2. The drive device for a construction machine according to claim 1, wherein
the rotating-shaft-side brake plate is a ring-shaped member independent of the spider member, and
the rotating-shaft-side brake plate is spline-connected to the outer periphery of the spider member.

3. The drive device for a construction machine according to claim 1, wherein
the speed reducer includes a plurality of speed reducing units, and
the rotating-shaft-side brake plate is provided on an outer periphery of the spider member of a highest speed reducing unit of the plurality of speed reducing units that reduces a speed of a highest speed rotation.

4. A drive device for a construction machine, comprising:
a motor as a drive source;
a speed reducer which transmits a rotation of the motor to a driven unit at a reduced speed; and
a brake mechanism which generates a braking force against the rotation to be transmitted from the speed reducer to the driven unit, wherein
the speed reducer includes a casing, a rotating shaft disposed in the casing, and a plurality of planetary gear type speed reducing units disposed in the casing,
the plurality of speed reducing units include a highest speed reducing unit that reduces a speed of a highest speed rotation,
the highest speed reducing unit includes a sun gear, a ring gear disposed to surround an outer side of the sun gear, a planetary gear which is meshed with the sun gear and the ring gear and is rotated as the sun gear is rotated, and a spider member which supports the planetary gear so that the planetary gear is rotatable,
the brake mechanism includes a rotating-shaft-side brake plate provided on an outer periphery of the spider member in a state that the rotating-shaft-side brake plate is integrally rotated with the spider member, a casing-side brake plate provided on the casing, and a brake piston which generates the braking force by bringing the rotating-shaft-side brake plate and the casing-side brake plate to press contact with each other, wherein
the casing is divided into a plurality of casing segments in an axis direction of the rotating shaft, the plurality of casing segments being detachably combined with each other,
the plurality of casing segments include a first casing segment, a second casing segment and a third casing segment which are arranged in order from the motor side,
the brake piston is disposed in the first casing segment, and
the rotating-shaft-side brake plate and the casing-side brake plate are disposed in the second casing segment.

5. The drive device for a construction machine according to claim 4, wherein
   the rotating-shaft-side brake plate is a ring-shaped member independent of the spider member, and
   the rotating-shaft-side brake plate is spline-connected to the outer periphery of the spider member.

\* \* \* \* \*